UNITED STATES PATENT OFFICE.

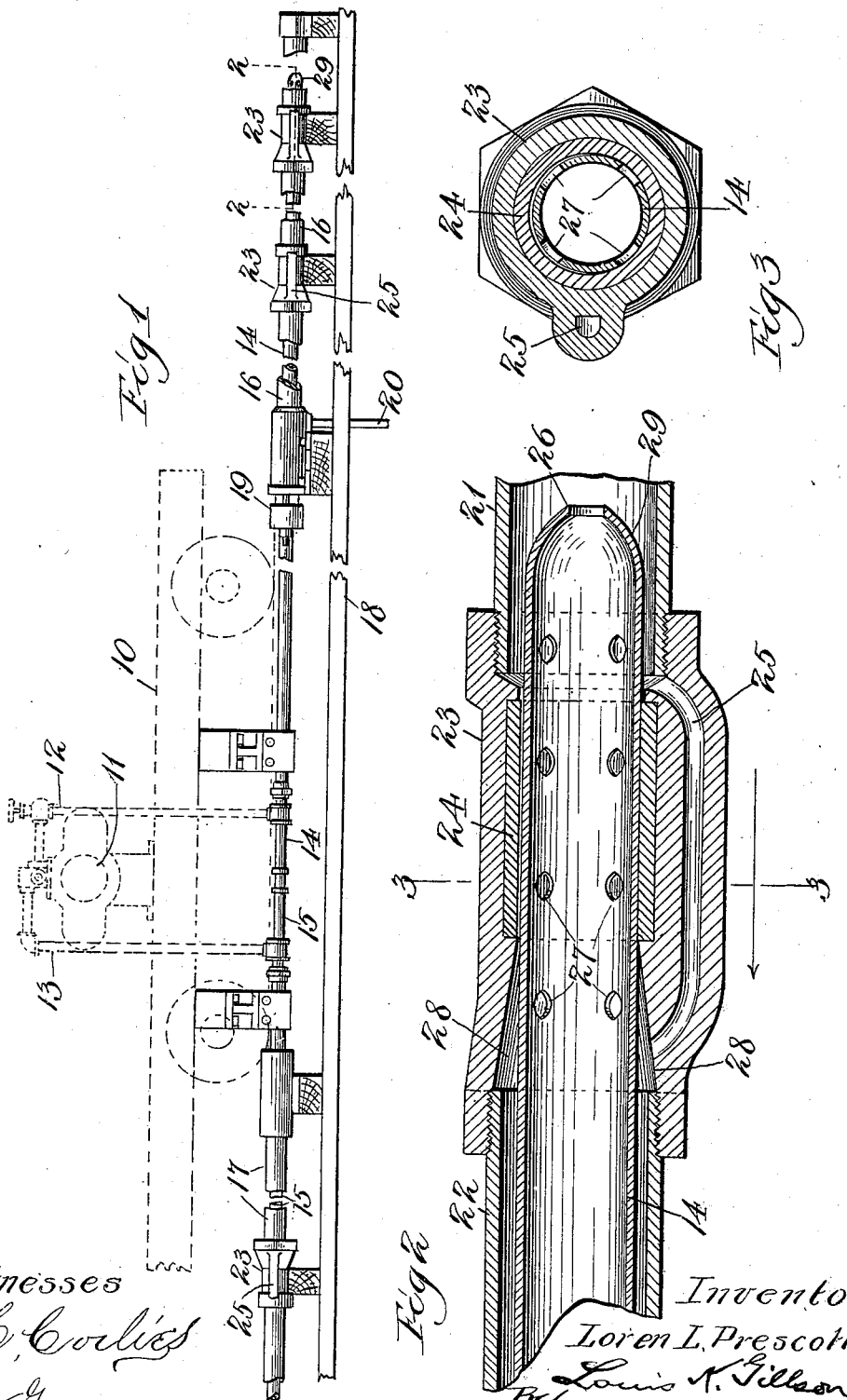

LOREN LOCKE PRESCOTT, OF MARINETTE, WISCONSIN.

PRESSURE-TRANSMITTER.

SPECIFICATION forming part of Letters Patent No. 658,220, dated September 18, 1900.

Application filed June 4, 1900. Serial No. 19,057. (No model.)

*To all whom it may concern:*

Be it known that I, LOREN LOCKE PRESCOTT, a citizen of the United States, and a resident of Marinette, county of Marinette and State of Wisconsin, have invented certain new and useful Improvements in Pressure-Transmitters, of which the following is a specification, and which are illustrated in the accompanying drawings, forming a part thereof.

This invention relates to that type of transmitters forming a connection between a stationary source of fluid-pressure and a movable motor—as, for example, in transmitting steam-pressure to a motor mounted upon a sawmill-carriage.

The objects of the invention are to simplify and cheapen the construction of such connections and to increase their efficiency and durability.

The invention consists in the structure hereinafter fully described, and illustrated in the accompanying drawings, in which—

Figure 1 is a detail side elevation of the transmitter, a sawmill-carriage being conventionally shown. Fig. 2 is a detail section on the line 2 2 of Fig. 1, and Fig. 3 is a cross-section on the line 3 3 of Fig. 2.

For the purpose of more clearly indicating the situation in which the device forming the subject of the application is intended to be used there is shown in the drawings the outline of a sawmill-carriage 10 and of a steam-motor 11, mounted thereon. At 12 and 13 there are shown, respectively, the steam service and exhaust pipes leading to and from the motor 11, these pipes connecting, respectively, with pipes 14 and 15, telescopically entering fixed pipes 16 and 17, mounted upon suitable brackets rising from the floor 18. The pipe 17 may lead to any suitable place of discharge for the exhaust-steam and needs no further description than that the hereinafter-described form of construction of the service side of the transmitter is followed in the exhaust side, so far as relates to the construction of the pipes 15 and 17, except that the end of the latter may be open. The outer end of the pipe 16 is closed, and at its inner end it is provided with a suitable stuffing-box 19, through which the pipe 14 enters. A steam-pipe 20 enters the pipe 16 at any desired point. As shown, it is located near the inner end of this pipe. The pipe 16 is of greater internal diameter than the external diameter of the pipe 14, so that the surfaces of the two are not in frictional engagement. The former pipe is composed of a plurality of comparatively-short sections, as 21 22, adjacent sections being united by couplings, as 23, having their ends internally screw-threaded for engagement with the pipe-sections and angular in cross-section for the application thereto of the wrench. Intermediate of their ends the couplings 23 are somewhat contracted, so as to form bearings for the pipe 14, and preferably they are provided with bushings 24, of antifriction metal, and each with a by-pass 25, extending longitudinally through the wall of the contracted portion, so as to allow the free transmission of steam from one section of the pipe 16 to the next. By making the bore of the coupling 23 sufficiently large the steam may pass by the pipe 14, and the by-pass 25 may be dispensed with.

The end of the pipe 14 is open, and preferably the pipe is provided with a plurality of apertures 27 near its end, so that the steam may freely enter it. The bore of the coupling 23 at its inner end—that is to say, the end toward the stuffing-box 19—preferably tapers inwardly, as shown at 28, so that as the pipe 14 advances its end will be guided to the bearing portion of the connection by the gentle incline of the wall at its inner end, and to avoid friction the extreme end of the pipe 26 is preferably somewhat contracted, as shown at 29, so that that portion which comes in contact with the inclined wall of the connection is itself inclined.

Heretofore in transmitters of this type the two telescoping tubes have been made to fit closely together throughout their entire lengths, and hence it has been necessary to carefully machine both the exterior of the inner pipe and the interior of the outer pipe. This has been an expensive operation and one difficult to perform, and, furthermore, any accident which might slightly bend the outer tube would incapacitate the entire device. The friction of the two long bearings has been excessive and of course the wear very great, and it has been necessary to connect the steam-pipe leading from the boiler with the extreme end of the stationary pipe. In the construction hereinbefore described it becomes unnecessary to dress out the interior of the external tube, and ample space is provided for the circulation of the steam throughout the entire length of this pipe, so that the steam may be led to it at any point where the connection can be most conveniently made. The couplings 23 provide convenient means for carrying the antifriction-bearings, and these may be easily replaced from time to time, if necessary. The wear will of course be at the lower side of the bearing, and this may be readily distributed by slightly turning the connection from time to time.

The by-pass 25 may be at the bottom, as shown in Fig. 2, or at the side, as shown in Fig. 3, or in any other position.

I claim as my invention—

1. In a connection between a stationary source of fluid-pressure and a movable fluid-motor, in combination, telescopically-engaged pipes of such relative size that their surfaces are out of frictional contact, the outer pipe being provided at intervals with annular bearing-blocks for carrying the inner pipe, such block being adapted to allow the passage of fluid.

2. In a connection between a stationary source of fluid-pressure and a movable fluid-motor, in combination, telescopically-engaged pipes of such relative size that their surfaces are out of frictional contact, the outer pipe being composed of sections, a coupling for uniting the adjacent sections and being contracted intermediate of its ends to provide bearings for the inner pipe.

3. In a connection between a stationary source of fluid-pressure and a movable fluid-motor, in combination, telescopically-engaged pipes of such relative size that their surfaces are out of frictional contact, the outer pipe being composed of sections, a coupling for uniting the adjacent sections, and a bushing of antifriction metal within each coupling to serve as a bearing for the inner pipe.

4. In a connection between a stationary source of fluid-pressure and a movable fluid-motor, in combination, telescopically-engaged pipes of such relative size that their surfaces are out of frictional contact, the outer pipe being composed of sections, a coupling for uniting the adjacent sections and being contracted intermediate of its ends to provide bearings for the inner pipe, and having a by-pass longitudinally through the wall of the contracted portion.

5. In a connection between a stationary source of fluid-pressure and a movable fluid-motor, in combination, telescopically-engaged pipes of such relative size that their surfaces are out of frictional contact, the outer pipe being composed of sections, a coupling for uniting the adjacent sections and being contracted intermediate of its ends to provide bearings for the inner pipe, the bore of the coupling being tapering at one end for the purpose specified.

LOREN LOCKE PRESCOTT.

Witnesses:
SUMNER K. PRESCOTT,
S. C. ELLIS.